United States Patent
Ikarashi et al.

(10) Patent No.: US 11,818,254 B2
(45) Date of Patent: Nov. 14, 2023

(54) SHARE GENERATING DEVICE, RECONSTRUCTING DEVICE, SECURE COMPUTATION SYSTEM, SHARE GENERATION METHOD, RECONSTRUCTION METHOD, PROGRAM, AND RECORDING MEDIUM

(71) Applicant: NIPPON TELEGRAPH AND TELEPHONE CORPORATION, Chiyoda-ku (JP)

(72) Inventors: Dai Ikarashi, Musashino (JP); Ryo Kikuchi, Musashino (JP); Koji Chida, Musashino (JP)

(73) Assignee: NIPPON TELEGRAPH AND TELEPHONE CORPORATION, Chiyoda-ku (JP)

( * ) Notice: Subject to any disclaimer, the term of this patent is extended or adjusted under 35 U.S.C. 154(b) by 318 days.

(21) Appl. No.: 16/639,000

(22) PCT Filed: Aug. 16, 2018

(86) PCT No.: PCT/JP2018/030442
§ 371 (c)(1),
(2) Date: Feb. 13, 2020

(87) PCT Pub. No.: WO2019/039383
PCT Pub. Date: Feb. 28, 2019

(65) Prior Publication Data
US 2020/0366466 A1 Nov. 19, 2020

(30) Foreign Application Priority Data
Aug. 22, 2017 (JP) ................................. 2017-159346

(51) Int. Cl.
*H04L 9/08* (2006.01)
*G09C 1/04* (2006.01)
*H04L 9/00* (2022.01)

(52) U.S. Cl.
CPC ................ *H04L 9/085* (2013.01); *G09C 1/04* (2013.01); *H04L 9/008* (2013.01); *H04L 9/0861* (2013.01); *H04L 2209/46* (2013.01)

(58) Field of Classification Search
CPC ....... H04L 9/085; H04L 9/008; H04L 9/0861; H04L 2209/46; G09C 1/04
See application file for complete search history.

(56) References Cited

U.S. PATENT DOCUMENTS

| | | | |
|---|---|---|---|
| 6,044,463 A | * | 3/2000 | Kanda ................... H04L 9/3221 713/168 |
| 7,995,765 B2 | | 8/2011 | Schneider |

(Continued)

FOREIGN PATENT DOCUMENTS

| | | | |
|---|---|---|---|
| EP | 2 879 324 A1 | 6/2015 | |
| EP | 2879324 A1 | * 6/2015 | ........... G06F 21/606 |
| WO | WO 2016/147718 A1 | 9/2016 | |

OTHER PUBLICATIONS

Hugo Krawczyk, "Secret Sharing Made Short," Advances in Cryptology—CRYPTO '93, LNCS 773, XP19194050, 1994, pp. 136-146.

(Continued)

*Primary Examiner* — Syed A Zaidi
(74) *Attorney, Agent, or Firm* — Oblon, McClelland, Maier & Neustadt, L.L.P.

(57) ABSTRACT

A share $[x]_i$ of plaintext x in accordance with Shamir's secret sharing scheme is expressed by N shares $[x_0]_i, \ldots, [x_{N-1}]_i$, and each share generating device $A_i$ obtains a function value $r_i = P_{m(i(-))}(s_i)$ of a seed $s_i$, obtains a first calculated value $\zeta_i = \lambda(i, i(-))[x_{i(-)}]_i + r_i$ using a Lagrange coefficient $\lambda(i, i(-))$, a share $[x_{i(-)}]_i$, and the function value $r_i$, and outputs the first (Continued)

calculated value $\zeta_i$ to a share generating device $A_{i(-)}$. Each share generating device $A_i$ accepts a second calculated value $\zeta_{i(+)}$, obtains a third calculated value $z_i=\lambda(i, i(+))[x_i]_i+\zeta_{i(+)}$ using a Lagrange coefficient $\lambda(i, i(+))$, a share $[x_i]_i$, and the second calculated value $\zeta_{i(+)}$, and obtains information containing the seed $s_i$ and the third calculated value $z_i$ as a share $SS_i$ of the plaintext x in secret sharing and outputs the share $SS_i$.

5 Claims, 5 Drawing Sheets

(56) References Cited

U.S. PATENT DOCUMENTS

| | | | |
|---|---|---|---|
| 9,432,188 B2* | 8/2016 | Chida | G06F 21/606 |
| 2005/0182606 A1* | 8/2005 | Chida | G06Q 20/382 |
| | | | 703/2 |
| 2008/0137868 A1* | 6/2008 | Sanders | H04L 9/0852 |
| | | | 380/278 |
| 2010/0008505 A1* | 1/2010 | Bai | H04L 9/085 |
| | | | 380/255 |
| 2010/0046739 A1 | 2/2010 | Schneider | |
| 2012/0030464 A1* | 2/2012 | Nishimaki | H04L 9/085 |
| | | | 713/167 |
| 2012/0163588 A1* | 6/2012 | Kobayashi | H04L 9/3073 |
| | | | 380/28 |
| 2013/0246812 A1* | 9/2013 | Resch | G06F 21/78 |
| | | | 713/193 |
| 2015/0172049 A1* | 6/2015 | Chida | H04L 9/0869 |
| | | | 380/46 |
| 2015/0193633 A1* | 7/2015 | Chida | H04L 9/085 |
| | | | 726/26 |
| 2018/0053442 A1 | 2/2018 | Ikarashi et al. | |

OTHER PUBLICATIONS

Shamir, A., "How to Share a Secret," Communications of the ACM, Nov. 1979. vol. 22, No. 11, pp. 612-613.
International Search Report dated Nov. 13, 2018 in PCT/JP2018/030442 filed on Aug. 16, 2018.

* cited by examiner

US 11,818,254 B2

SHARE GENERATING DEVICE, RECONSTRUCTING DEVICE, SECURE COMPUTATION SYSTEM, SHARE GENERATION METHOD, RECONSTRUCTION METHOD, PROGRAM, AND RECORDING MEDIUM

TECHNICAL FIELD

The present invention relates to cryptographic technologies and, in particular, relates to a secure computation technique.

BACKGROUND ART

One of secret sharing schemes is Shamir's secret sharing scheme (see, for example, Non-patent Literature 1 and so forth).

PRIOR ART LITERATURE

Non-Patent Literature

Non-patent Literature 1: A. Shamir, "How to Share a Secret", Communications of the ACM, November 1979, Volume 22, Number 11, pp. 612-613.

SUMMARY OF THE INVENTION

Problems to be Solved by the Invention

Secure computation devices can perform secure computation using shares obtained in accordance with Shamir's secret sharing scheme without changing them. However, when shares are distributed among N secure computation devices in accordance with the secret sharing scheme and secure computation is performed, the total amount of data of shares, which indicate the secure computation result, is N times the amount of data of plaintext. Thus, if these shares are transmitted without being changed, the total amount of communication data is also N times the amount of data of the plaintext.

An object of the present invention is to provide a technique for generating shares whose total amount of communication data is small from shares in accordance with Shamir's secret sharing scheme.

Means to Solve the Problems

Each share generating device $A_i$ included in N share generating devices $A_0, \ldots, A_{N-1}$ executes the following. It is to be noted that N is an integer greater than or equal to 2, in is an integer greater than or equal to 1, m(i) is an integer greater than or equal to 0 and less than m, i=0, ..., N−1 holds, j=0, ..., N−1 holds, i(+)=i+1 mod N holds, i(−)=i−1 mod N holds, $P_{m(i)}$ is a function, and the range of the function $P_{m(i)}$ belongs to a set $F^{m(i)}$ whose members are sequences of elements of m(i) fields F. The sum of a value which is obtained by multiplying a share $[\alpha]_i$ in accordance with Shamir's secret sharing scheme by a Lagrange coefficient $\lambda(i, i(-))$ and a value which is obtained by multiplying a share $[\alpha]_{i(-)}$ in accordance with Shamir's secret sharing scheme by a Lagrange coefficient $\lambda(i(-), i)$ is a reconstructed value $\alpha$. The sum of a value which is obtained by multiplying the share $[\alpha]_i$ by a Lagrange coefficient $\lambda(i, i(+))$ and a value which is obtained by multiplying a share $[\alpha]_{i(+)}$ in accordance with Shamir's secret sharing scheme by a Lagrange coefficient $\lambda(i(+), i)$ is also the reconstructed value $\alpha$.

A share $[x]_i \in F^m$ of plaintext x in accordance with Shamir's secret sharing scheme is expressed by N shares $[x_0]_i, \ldots, [x_{N-1}]_i$, which satisfy m=m(0)+ ... +m(N−1) and $[x_j]_i \in F^{m(j)}$, by secure computation. Each share generating device $A_i$ obtains a function value $r_i = P_{m(i(-))}(s_i) \in F^{m(i(-))}$ of a seed $s_i$, obtains a first calculated value $\zeta_i = \lambda(i, i(-))[x_{i(-)}]_i + r_i \in F^{m(i(-))}$ using the Lagrange coefficient $\lambda(i, i(-))$, a share $[x_{i(-)}]_i$, and the function value $r_i$, and outputs the first calculated value $\zeta_i$ to a share generating device $A_{i(-)}$. Each share generating device $A_i$ accepts a second calculated value $\zeta_{i(+)} \in F^{m(i)}$, obtains a third calculated value $z_i = \lambda(i, i(+))[x_i]_i + \zeta_{i(+)} \in F^{m(i)}$ using the Lagrange coefficient $\lambda(i, i(+))$, a share $[x_i]_i$, and the second calculated value $\zeta_{i(+)}$, and obtains information containing the seed $s_i$ and the third calculated value $z_i$ as a share $SS_i$ of the plaintext x in secret sharing and outputs the share $SS_i$.

Effects of the Invention

In the present invention, it is possible to generate shares whose total amount of communication data is small from shares in accordance with Shamir's secret sharing scheme.

DETAILED DESCRIPTION OF THE EMBODIMENTS

Hereinafter, embodiments of the present invention will be described with reference to the drawings.

First Embodiment

First, a first embodiment will be described.

<Configuration>

Figure 1:
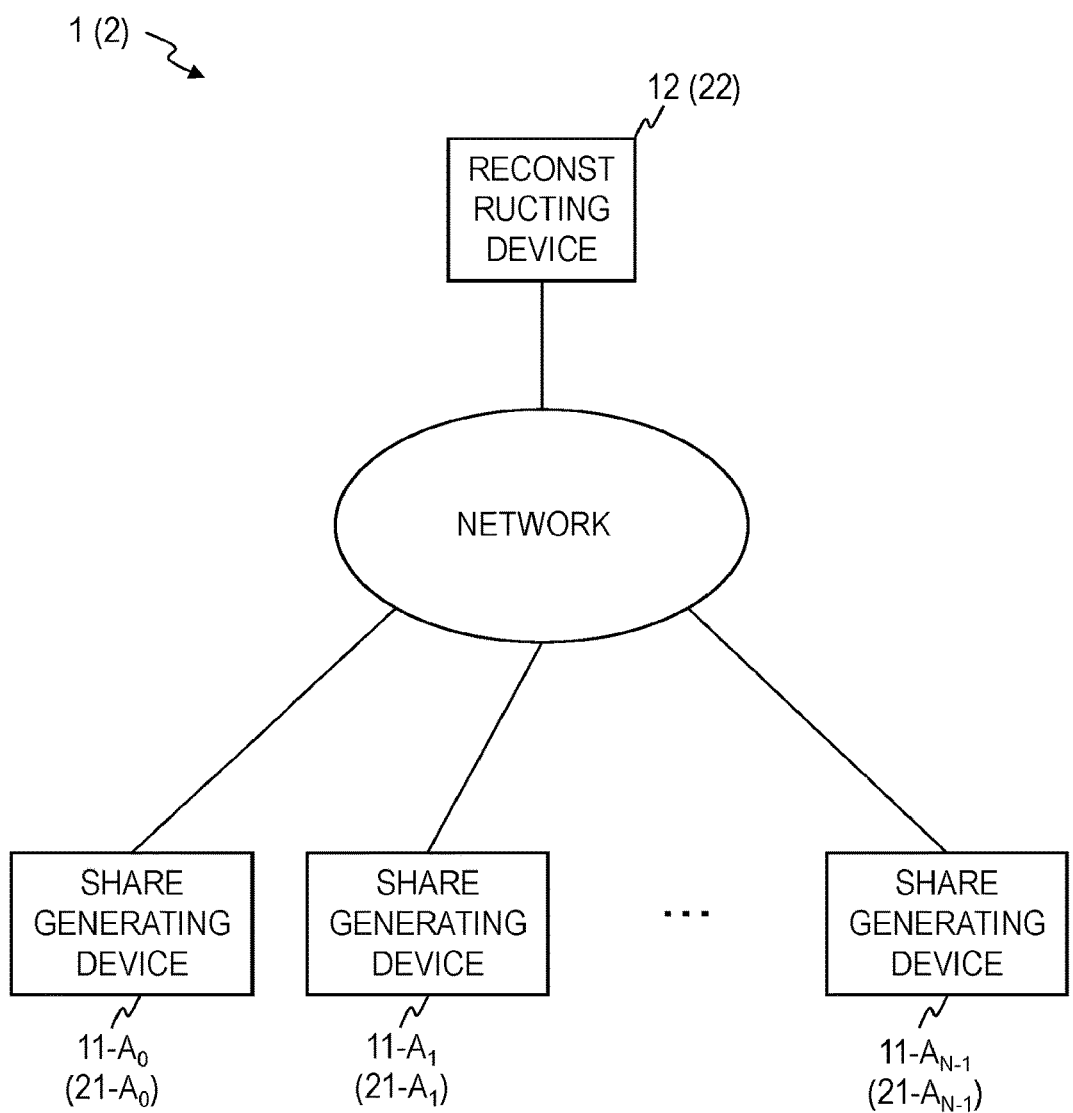
FIG. 1 is a block diagram illustrating the configuration of a secure computation system of an embodiment.

As illustrated in FIG. 1, a secure computation system 1 of the present embodiment includes N share generating devices 11-$A_0$, ..., 11-$A_{N-1}$ and a reconstructing device 12, and these devices can communicate with one another through a network such as the Internet. It is to be noted that N is an integer greater than or equal to 2. For example, N is an integer greater than or equal to 3. One example of N is N=3. Although FIG. 1 illustrates one reconstructing device 12, the secure computation system 1 may include a plurality of reconstructing devices.

Figure 2:
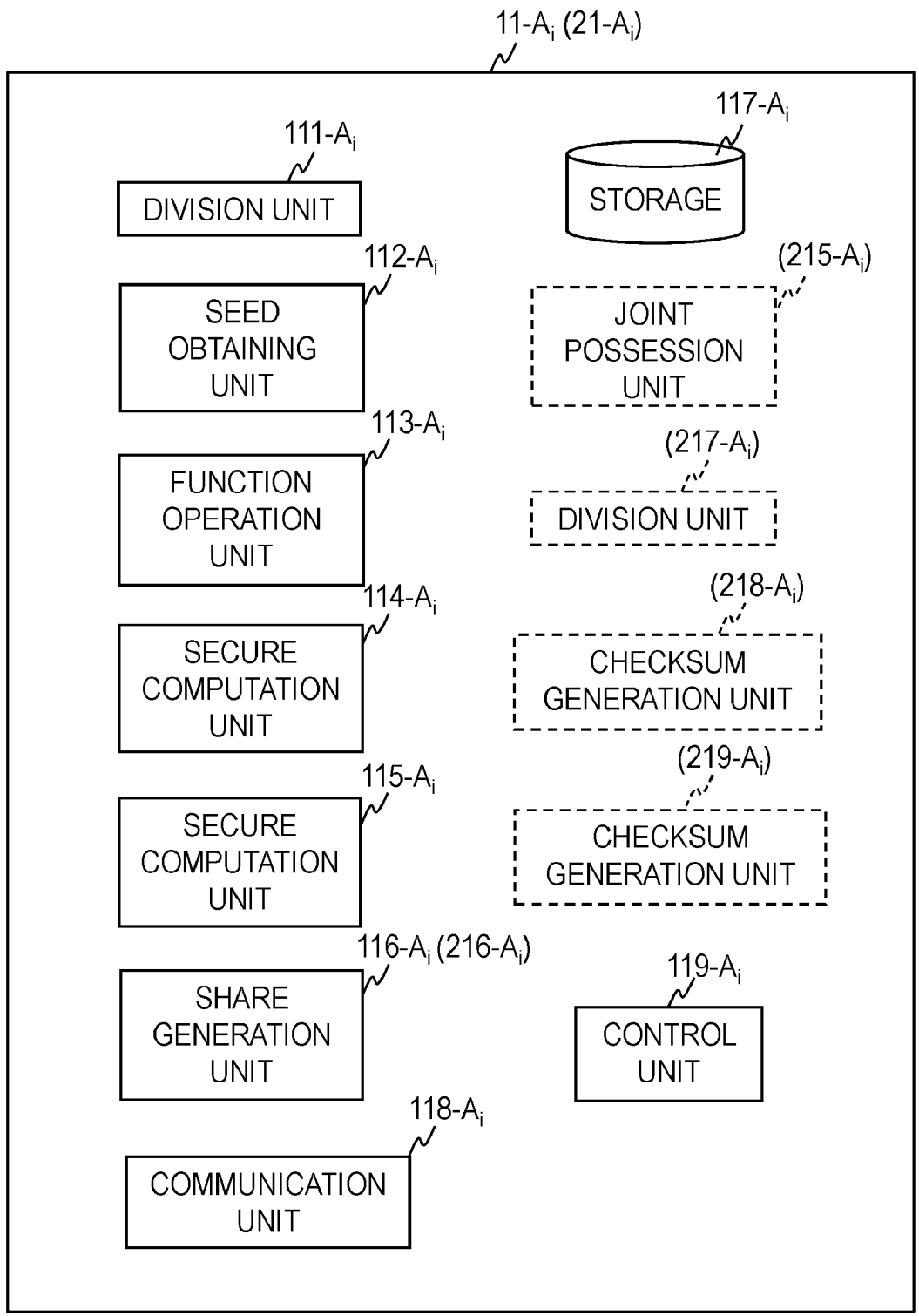
FIG. 2 is a block diagram illustrating the functional configuration of a share generating device of the embodiment.

As illustrated in FIG. 2, each share generating device 11-$A_i$ (i=0, ..., N−1) of the present embodiment includes a division unit 111-$A_i$, a seed obtaining unit 112-$A_i$, a function operation unit 113-$A_i$, secure computation units 114-$A_i$ and 115-$A_i$, a share generation unit 116-$A_i$, a storage 117-$A_i$, a communication unit 118-$A_i$, and a control unit 119-$A_i$ and executes each processing under control of the control unit 119-$A_i$. Information output from each processing unit (a part that performs processing) of the share generating device 11-$A_i$ is stored in the storage 117-$A_i$ and is read therefrom when necessary and input to another processing unit.

Figure 3:
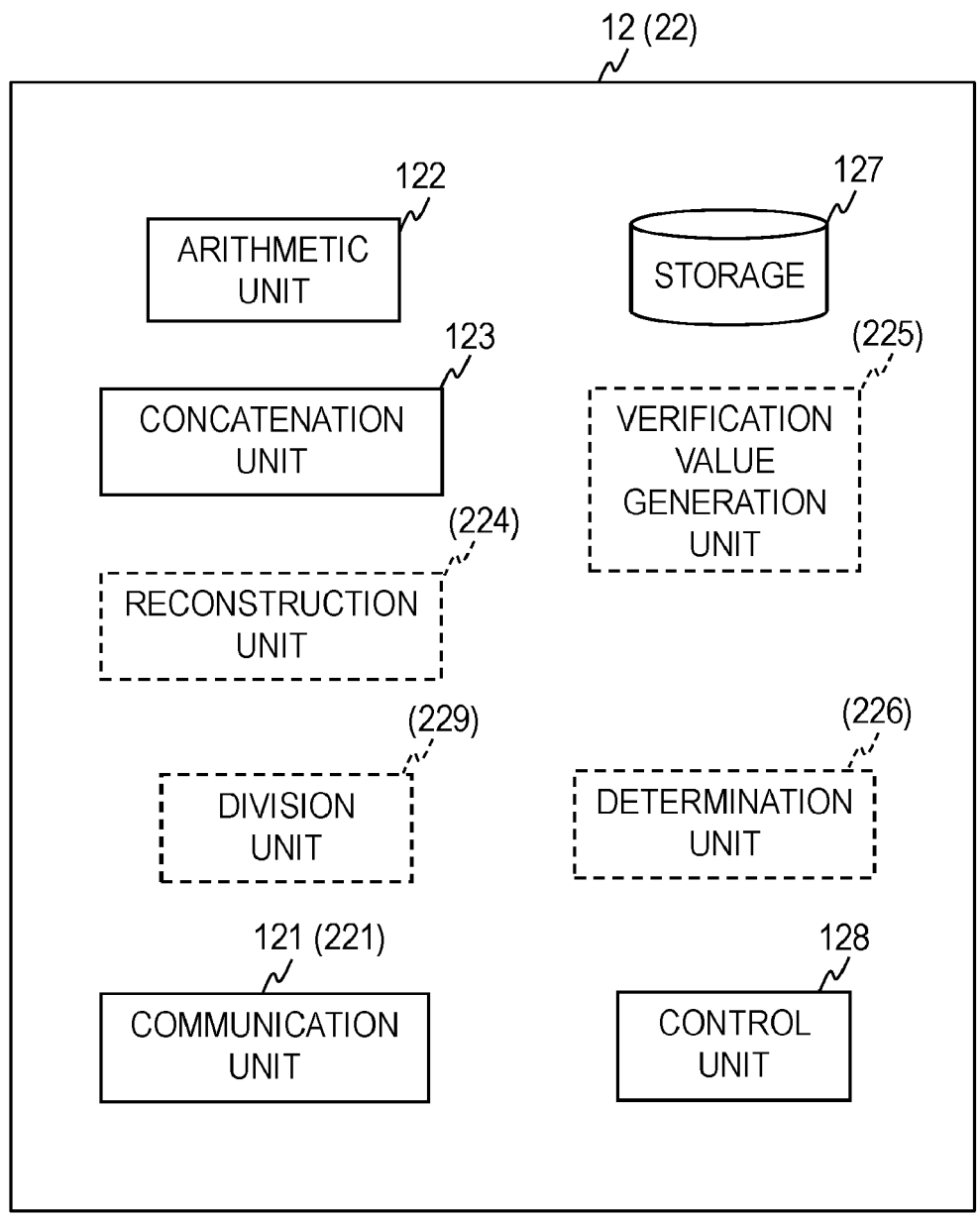
FIG. 3 is a block diagram illustrating the functional configuration of a reconstructing device of the embodiment.

As illustrated in FIG. 3, the reconstructing device 12 of the present embodiment includes a communication unit 121, an arithmetic unit 122, a concatenation unit 123, a storage 127, and a control unit 128 and executes each processing under control of the control unit 128. Information output from each processing unit of the reconstructing device 12 is stored in the storage 127 and is read therefrom when necessary and input to another processing unit.

<Share Generation Method>

Figure 4:
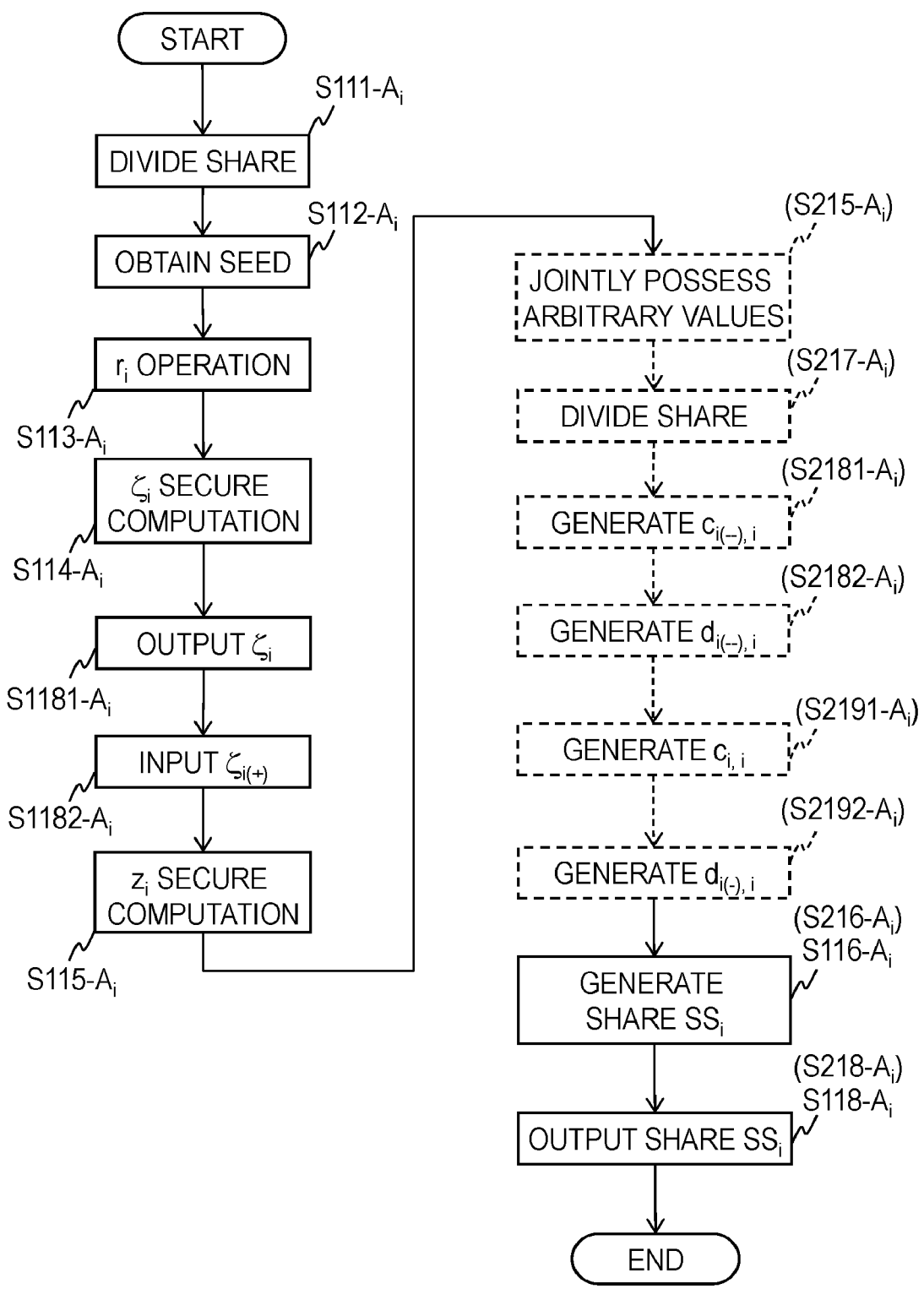
FIG. 4 is a flow diagram for explaining a share generation method of the embodiment.

A share generation method (a share conversion method) which is performed by each share generating device 11-$A_i$ (i=0, . . . , N−1) (FIG. 2) of the present embodiment will be described using FIG. 4. It is assumed that a share $[x]_i \in F^m$ of plaintext $x \in F^m$ in accordance with Shamir's secret sharing scheme is stored in the storage 117-$A_i$ of each share generating device 11-$A_i$. A "share" means a fragment in secret sharing. Shamir's secret sharing scheme of the embodiment is a 2-out-of-N threshold secret sharing scheme, in which, given any two different shares, a reconstructed value (plaintext) can be reconstructed; however, given any one piece of share information, information on the reconstructed value cannot be obtained at all. The sum of a value which is obtained by multiplying a share $[\alpha]_i$ in accordance with Shamir's secret sharing scheme by a Lagrange coefficient $\lambda(i, i(-))$ and a value which is obtained by multiplying a share $[\alpha]_{i(-)}$ in accordance with Shamir's secret sharing scheme by a Lagrange coefficient $\lambda(i(-), i)$ is a reconstructed value $\alpha$, and the sum of a value which is obtained by multiplying the share $[\alpha]_i$ by a Lagrange coefficient $\lambda(i, i(+))$ and a value which is obtained by multiplying a share $[\alpha]_{i(+)}$ in accordance with Shamir's secret sharing scheme by a Lagrange coefficient $\lambda(i(+), i)$ is also the reconstructed value $\alpha$. That is, $$\alpha = \lambda(i,i(-))[\alpha]_i + \lambda(i(-),i)[\alpha]_{i(-)}$$

$$\alpha = \lambda(i,i(+))[\alpha]_i + \lambda(i(+),i)[\alpha]_{i(+)}$$

are satisfied. In other words, $\lambda(i, i(-))$ is a coefficient by which the share $[\alpha]_i$ is multiplied when the reconstructed value $\alpha$ is reconstructed from the share $[\alpha]_i$ and the share $[\alpha]_{i(-)}$ and $\lambda(i(-), i)$ is a coefficient by which the share $[\alpha]_{i(-)}$ is multiplied at the time of this reconstruction. $\lambda(i, i(+))$ is a coefficient by which the share $[\alpha]_i$ is multiplied when the reconstructed value $\alpha$ is reconstructed from the share $[\alpha]_i$ and the share $[\alpha]_i+)$ and $\lambda(i(+), i)$ is a coefficient by which the share $[\alpha]_{i(+)}$ is multiplied at the time of this reconstruction. It is to be noted that $i(+)=i+1 \mod N$ and $i(-)=i-1 \mod N$ hold. These Lagrange coefficients $\lambda(i, i(-))$, $(i(-), i)$, $\lambda(i, i(+))$, and $\lambda(i(+), i)$ can be easily determined by publicly known Lagrange's interpolation formula. $F^m$ means a set whose members are sequences of elements of in fields F. One example of the set $F^m$ is in-dimensional vectors, whose members are elements of in fields F. $\alpha \in \beta$ means that a is a member of $\beta$. m is an integer greater than or equal to 1. For instance, m is an integer greater than or equal to 2 or an integer greater than or equal to 3. An example of the field F is a set of remainders modulo a prime number p ($\alpha \mod p$, where $\alpha$ is any number), and the operation result in the field F in this case is obtained as a remainder modulo a prime number p. $p \geq 3$ holds and, for instance, $p=2^{61}-1$ holds. Moreover, the share $[x]_i$ may be a share transmitted from another device or a share obtained by performing secure computation on a share transmitted from another device.

The division unit 111-$A_i$ (a first division unit) reads the share $[x]_i \in F^m$ of the plaintext x in accordance with Shamir's secret sharing scheme described above from the storage 117-$A_i$. The division unit 111-$A_i$ divides the share $[x]_i$ into N shares $[x_0]_i, \ldots, [x_{N-1}]_i$ by secure computation and outputs the shares $[x_0]_i, \ldots, [x_{N-1}]_i$. It is to be noted that m(i) is an integer greater than or equal to 0 and less than in (for example, m(i) is an integer greater than or equal to 1), in = m(0)+ . . . +m(N−1) is satisfied, and, for i=0, . . . , N−1 and j=0, . . . , N−1, $[x_i]_i \in F^{m(j)}$ is satisfied. It is also possible to make m(0)= . . . =m(N−1)=m/N hold if m is a multiple of N. However, irrespective of whether or not in is a multiple of N, all of m(0), . . . , m(N−1) may not be identical with one another. For example, at least part of m(0), . . . , m(N−1) may be 0. It is to be noted that $\gamma \in F^0$ represents a null value. If m(i)=0, $[x_i]_i \in F^{m(i)}$ is a null value. $[x_j]_i$ is a share of plaintext $x_j$ in accordance with Shamir's secret sharing scheme described above. The plaintext x is expressed by N $x_0 \in F^{m(0)}, \ldots, x_{N-1} \in F^{m(N-1)}$. For example, the plaintext x is expressed as a sequence $x_0 | \ldots | x_{N-1}$ obtained by arranging N $x_0 \in F^{m(0)} \ldots, x_{N-1} \in F^{m(N-1)}$. To divide the share $[x]_i$ into the N shares $[x_0]_i, \ldots, [x_{N-1}]_i$ by secure computation, it is only necessary to, for instance, separate and divide the share $[x]_i$ directly into the N shares $[x_0]_i \in F^{m(0)}, \ldots, [x_{N-1}]_i \in F^{m(N-1)}$. It is to be noted that, if m=1, only one of m(0), . . . , m(N−1) is 1 and the others are 0. In this case, the division unit 111-$A_i$ does not have to divide the share $[x]_i$ and only has to output any one of the shares $[x_0]_i, \ldots, [x_{N-1}]_i$ as $[x]_i$ and output all of the other shares as null values. As described above, the share $[x]_i$ is expressed by the N shares $[x_0]_i, \ldots, [x_{N-1}]_i$. For instance, the share $[x]_i$ is expressed as a sequence $[x_0]_i | \ldots | [x_{N-1}]_i$ obtained by arranging the N shares $[x_0]_i, \ldots, [x_{N-1}]_i$ (Step S111-$A_i$).

The seed obtaining unit 112-$A_i$ obtains a seed $s_i$ and outputs the seed $s_i$. There is no limitation on the data format of the seed $s_i$ and any value can be used as the seed $s_i$. One example of the seed $s_i$ is an element of a set $F^{w(i)}$ whose members are sequences of elements of w(i) fields F ($s_i \in F^{w(i)}$). It is to be noted that w(i) is an integer greater than or equal to 1 and less than m. The seed $s_i$ (i=0, . . . , N−1) may be an arbitrary value or an output value obtained by other processing. The "arbitrary value" may be a random number (a pseudo random number or a true random number), a value selected from a plurality of preset values, or a value obtained by other processing. It is to be noted that the seed $s_i$ corresponding to the share $[x_j]_i$ which is a null value may be set at a null value (Step S112-$A_i$).

The function operation unit 113-$A_i$ obtains a function value $r_i = P_{m(i(-))}(s_i) \in F^{m(-)}$ (for example, a pseudo random number) using the seed $s_i$ as input and outputs the function value $r_i$. It is to be noted that $P_{m(i(-))}(s_i)$ is a function value which is obtained by operating a function $P_{m(i(-))}$ on the seed $s_i$. $P_{m(i)}: F^{w(i(+))} \to F^{m(i)}$ is a function and the range of a function $P_{m(i)}$ belongs to a set $F^{m(i)}$ whose members are sequences of elements of m(i) fields F. One example of the set $F^{m(i)}$ is a set of m(i)-dimensional vectors, whose members are elements of m(i) fields F. The domain of definition of the function $P_{m(i)}$ may be any domain of definition. For instance, the domain of definition of the function $P_{m(i)}$ belongs to a set $F^{w(i(+))}$ whose members are sequences of elements of w(i(+)) fields F. Preferably, w(i(+))<m(i) is satisfied (the amount of data of the seed $s_i$ is smaller than the amount of data of the function value $r_i$). An example of $P_{m(i)}$ is a pseudo random number generating function. That is, $P_{m(i(-))}$ is a function and the range of the function $P_{m(i(-))}$ belongs to a set $F^{m(i(-))}$ whose members are sequences of elements of $m(i(-))$ fields F. For example, the domain of definition of the function $P_{m(i(-))}$ belongs to the set $F^{w(i)}$ whose members are sequences of elements of $w(i)$ fields F. Preferably, $w(i) \leq m(i(-))$ is satisfied. It is to be noted that the function value $r_i$ corresponding to the share $[x_j]_i$ which is a null value may be set at a null value (Step S113-$A_i$).

The secure computation unit 114-$A_i$ (a first secure computation unit) obtains, using a share $[x_{i(-)}]_i$ and the function value $r_i$ as input, a calculated value (a first calculated value) $\zeta_i = \lambda(i, i(-))[x_{i(-)}]_i + r_i \in F^{m(i(-))}$ using the Lagrange coefficient $\lambda(i, i(-))$, the share $[x_{i(-)}]_i$, and the function value $r_i$ and outputs the calculated value $\zeta_i$. It is to be noted that $\zeta_i = \lambda(i, i(-))[x_{i(-)}]_i + r_i$ corresponding to the share $[x_{i(-)}]_i$ which is a null value is set at a null value (Step S114-$A_i$).

The calculated value $\zeta_i$ is input to the communication unit 118-$A_i$. The communication unit 118-$A_i$ (an output unit) outputs the calculated value $\zeta_i$ to a share generating device 11-$A_{i(-)}$. The output calculated value $\zeta_i$ is transmitted to the share generating device 11-$A_{i(-)}$ through the network (Step S1181-$A_i$).

A calculated value (a second calculated value) $\zeta_{i(+)} = \lambda(i(+), i)[x_i]_{i(+)} + r_{i(+)} \in F^{m(i)}$ ($r_{i(+)} = P_{m(i)}(s_{i(+)})$) output from a share generating device 11-$A_{i(+)}$ is transmitted to the share generating device 11-$A_i$ through the network in a similar manner. It is to be noted that $\zeta_{i(+)} = \lambda(i(+), i)[x_i]_{i(+)} + r_{i(+)}$ corresponding to the share $[x_i]_{i(+)}$ which is a null value is set at a null value. The calculated value $\zeta_{i(+)}$ is received (accepted) by the communication unit 118-$A_i$ (an input unit) and output (Step S1182-$A_i$).

The secure computation unit 115-$A_i$ (a second secure computation unit) obtains, using a share $[x_i]_i$ and the calculated value $i(+)$ as input, a calculated value (a third calculated value) $z_i = \lambda(i, i(+))[x_i]_i + \zeta_{i(+)} \in F^{m(i)}$ using the Lagrange coefficient $\lambda(i, i(+))$, the share $[x_i]_i$, and the calculated value $\zeta_{i(+)}$ and outputs the calculated value $z_i$. Since $\zeta_{i(+)} = \lambda(i(+), i)[x_i]_{i(+)} + r_{i(+)}$, $z_i = \lambda(i, i(+))[x_i]_i + \lambda(i(+), i)[x_i]_{i(+)} + r_{i(+)}$ holds. Moreover, since $x_i = \lambda(i, i(+))[x_i]_i + \lambda(i(+), i)[x_i]_{i(+)}$, $z_i = x_i + r_{i(+)}$ holds. It is to be noted that $z_i$ corresponding to the share $[x_i]_i$ which is a null value is set at a null value (Step S115-$A_i$).

The seed $s_i$ output from the seed obtaining unit 112-$A_i$ and the calculated value $z_i$ output from the secure computation unit 115-$A_i$ are input to the share generation unit 116-$A_i$. The share generation unit 116-$A_i$ obtains information containing the seed $s_i$ and the calculated value $z_i$ as a share $SS_i$ of the plaintext x in secret sharing and outputs the share $SS_i$. The share $SS_i$ corresponding to the seed $s_i$ and the calculated value $z_i$ which are null values is information in which the seed $s_i$ and the calculated value $z_i$ are set at null values (Step S116-$A_i$).

The share $SS_i$ output from the share generation unit 116-$A_i$ is input to the communication unit 118-$A_i$. The communication unit 118-$A_i$ outputs the share $SS_i$ to the reconstructing device 12. The output share $SS_i$ is transmitted to the reconstructing device 12 through the network. The size of the seed $s_i$ and N do not depend on m. In (2, N)-Shamir's secret sharing, the order of magnitude of the total share size (the total share size which is transmitted) that relates to the data size m of the plaintext x is O(Nm); in the present embodiment, the order of magnitude of the total share size that relates to the data size in of the plaintext x is just O(m). The size of each share is O(m/N). For example, the total amount of data of the share $SS_i$ which is transmitted from each share generating device 11-$A_i$ (i=0, . . . , N−1) is less than N times the amount of data of the plaintext x. For instance, the amount of data of each share $SS_i$ is smaller than the amount of data of the plaintext x (Step S118-$A_i$).

<Reconstruction Method>

Figure 5:
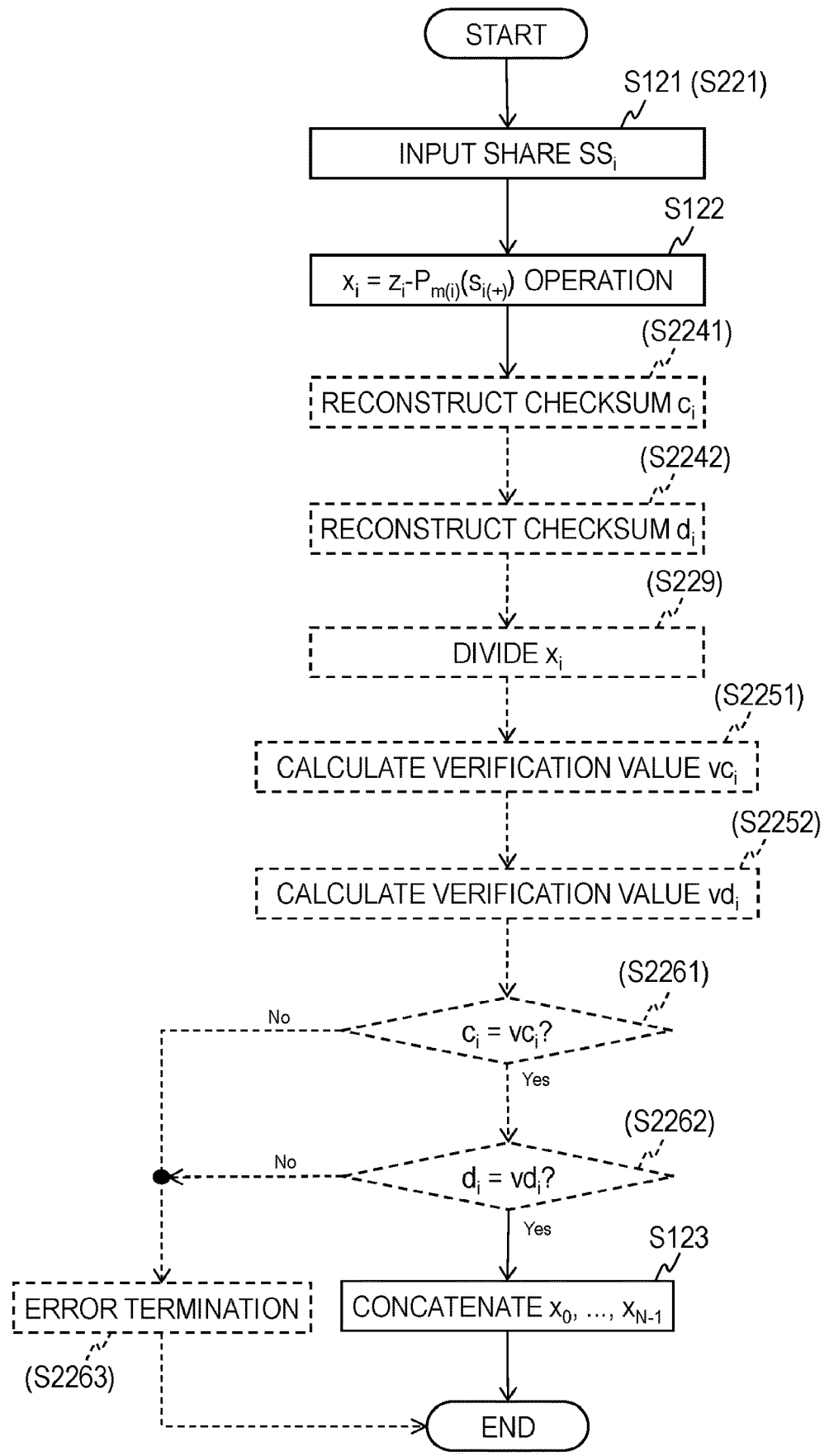
FIG. 5 is a flow diagram for explaining a reconstruction method of the embodiment.

A reconstruction method which is performed by the reconstructing device 12 (FIG. 3) of the present embodiment will be described using FIG. 5.

N shares $SS_0, \ldots, SS_{N-1}$ output from the share generating devices 11-$A_0, \ldots, 11$-$A_{N-1}$ are received (accepted) by the communication unit 121 (an input unit) of the reconstructing device 12 (Step S121).

For each i=0, . . . , N−1, the calculated value $z_i$ contained in the share $SS_i$ and a seed $s_{i(+)}$ contained in a share $SS_{i(+)}$ are input to the arithmetic unit 122. The arithmetic unit 122 obtains a member $x_i = z_i - P_{m(i)}(s_{i(+)}) \in F^{m(i)}$ using the calculated value $z_i$ and the seed $s_{i(+)}$ and outputs the member $x_i$. It is to be noted that $P_{m(i)}(s_{i(+)})$ is a function value which is obtained by operating the function $P_{m(i)}$ on the seed $s_{i(+)}$. The function $P_{m(i)}$ is the same as the function defined in Step S113-$A_i$. As indicated in Step S115-$A_i$, $z_i = x_i + r_{i(+)}$ holds. Moreover, as indicated in Step S1182-$A_i$, $r_{i(+)} = P_{m(i)}(s_{i(+)})$ holds. Thus, the member $x_i$ is obtained by an operation $z_i - P_{m(i)}(s_{i(+)})$. It is to be noted that the member $x_i$ corresponding to the calculated value $z_i$ and the seed $s_{i(+)}$ which are null values is set at a null value (Step S122).

The members $x_0, \ldots, x_{N-1}$ obtained in the arithmetic unit 122 are input to the concatenation unit 123. The concatenation unit 123 obtains a reconstructed value x obtained by concatenating (joining) the members $x_0, \ldots, x_{N-1}$ to one another and outputs the reconstructed value x. For example, a sequence $x_0 | \ldots | x_{N-1}$ obtained by arranging $x_0 \in F^{m(0)}, \ldots, x_{N-1} \in F^{m(N-1)}$ is x (Step S123).

Features of the Present Embodiment

Each share generating device 11-$A_i$ (i=0, . . . , N−1) obtains the share $SS_i$ containing the seed $s_i$ and the calculated value $z_i \in F^{m(i)}$ from the share $[x]_i$ in accordance with Shamir's secret sharing scheme and outputs the share $SS_i$. Here, the size of the seed $s_i$ and N do not depend on m. In (2, N)-Shamir's secret sharing, the order of magnitude of the total share size (the total share size which is transmitted) that relates to the data size m of the plaintext x is O(Nm); in the present embodiment, the order of magnitude of the total share size that relates to the data size m of the plaintext x is just O(m). The size of each share is O(m/N). For example, by setting m(i) and w(i) so that m(i)<m and w(i)<m, it is possible to make the total amount of data of the shares $SS_0, \ldots, SS_{N-1}$ less than N times the amount of data of the plaintext $x \in F^m$. This makes it possible to make the total amount of communication data smaller than that of shares in accordance with Shamir's secret sharing scheme. Each share generating device 11-$A_i$ can obtain the share $SS_i$ whose amount of data is small from the share $[x]_i$ in accordance with Shamir's secret sharing scheme without obtaining information on the plaintext x. The reconstructing device 12 can reconstruct the plaintext x using the N shares $SS_0, \ldots, SS_{N-1}$.

Second Embodiment

A second embodiment is a modification of the first embodiment. In the present embodiment, a checksum corresponding to a share is generated at the time of share generation and the share is verified using the checksum at the time of reconstruction of plaintext. In the following description, an explanation of a matter that has already been described in the first embodiment is sometimes simplified, using the same reference character as that of the first embodiment.

<Configuration>

As illustrated in FIG. 1, a secure computation system 2 of the present embodiment includes N share generating devices 21-$A_0$, . . . , 21-$A_{N-1}$ and a reconstructing device 22, and these devices can communicate with one another through a network such as the Internet. It is to be noted that N of the present embodiment is an integer greater than or equal to 3. One example of N is N=3. Although FIG. 1 illustrates one reconstructing device 22, the secure computation system 2 may include a plurality of reconstructing devices.

As illustrated in FIG. 2, each share generating device 21-$A_i$ (i=0, . . . , N−1) of the present embodiment includes a division unit 111-$A_i$, a seed obtaining unit 112-$A_i$, a function operation unit 113-$A_i$, secure computation units 114-$A_i$ and 115-$A_i$, a joint possession unit 215-$A_i$, a share generation unit 216-$A_i$, a division unit 217-$A_i$, checksum generation units 218-$A_i$ and 219-$A_i$, a storage 117-$A_i$, a communication unit 118-$A_i$, and a control unit 119-$A_i$ and executes each processing under control of the control unit 119-$A_i$. Information output from each processing unit (a part that performs processing) of the share generating device 21-$A_i$ is stored in the storage 117-$A_i$ and is read therefrom when necessary and input to another processing unit.

As illustrated in FIG. 3, the reconstructing device 22 of the present embodiment includes a communication unit 221, an arithmetic unit 122, a concatenation unit 123, a reconstruction unit 224, a verification value generation unit 225, a determination unit 226, a division unit 229, a storage 127, and a control unit 128 and executes each processing under control of the control unit 128. Information output from each processing unit of the reconstructing device 22 is stored in the storage 127 and is read therefrom when necessary and input to another processing unit.

<Share Generation Method>

A share generation method which is performed by the share generating device 21-$A_i$ (FIG. 2) will be described using FIG. 4. First, in place of the share generating device 11-$A_i$, the share generating device 21-$A_i$ executes the processing from Steps S111-$A_i$ to S115-$A_i$ described in the first embodiment. It is to be noted that, in the present embodiment, N and m are integers greater than or equal to 3.

Next, the joint possession unit 215-$A_i$ of each share generating device 21-$A_i$ possesses an arbitrary value $t_{i(--)} \in F^v$ jointly with a joint possession unit 215-$A_{i(--)}$ of a share generating device 21-$A_{i(--)}$, possesses an arbitrary value $t_i \in F^v$ jointly with a joint possession unit 215-$A_{i(++)}$ of a share generating device 21-$A_{i(++)}$, possesses an arbitrary value $u_{i(--)} \in F^v$ jointly with a joint possession unit 215-$A_{i(+)}$ of a share generating device 21-$A_{i(+)}$, and possesses an arbitrary value $u_{i(-)} \in F^v$ jointly with a joint possession unit 215-$A_{i(--)}$ of a share generating device 21-$A_{i(--)}$. That is, the joint possession unit 215-$A_i$ and the joint possession unit 215-$A_{i(--)}$ obtain the same arbitrary value $t_{i(--)}$, the joint possession unit 215-$A_i$ and the joint possession unit 215-$A_{i(++)}$ obtain the same arbitrary value $t_i$, the joint possession unit 215-$A_{i(-)}$ and the joint possession unit 215-$A_{i(+)}$ obtain the same arbitrary value $u_{i(--)}$, and the joint possession unit 215-$A_i$ and the joint possession unit 215-$A_{i(-)}$ obtain the same arbitrary value $u_{i(-)}$. It is to be noted that v is an integer greater than or equal to 1 and, for example, v=1 holds. A greater data amount reduction effect can be achieved if v is less than or equal to in (for instance, v is less than m). i(+)=i+1 mod N, i(−)=i−1 mod N, i(++)=i+2 mod N, and i(−−)=i−2 mod N hold. Joint possession of an arbitrary value γ between a joint possession unit $β_1$ and a joint possession unit $β_2$ may be performed by transmission of the arbitrary value γ or information for identification of the arbitrary value γ from the joint possession unit $β_1$ to the joint possession unit $β_2$ or may be performed by transmission of the arbitrary value γ or information for identification of the arbitrary value γ from the joint possession unit $β_2$ to the joint possession unit $β_1$, or the joint possession unit $β_1$ and the joint possession unit $β_2$ may jointly possess the arbitrary value γ by jointly possessing a common seed value and executing the same processing using the common seed value. The arbitrary values $t_{i(--)}$, $t_i$, $u_{i(--)}$, and $u_{i(-)}$ may be random numbers (pseudo random numbers or true random numbers), values obtained by other processing, or values selected from a plurality of predetermined values. Joint possession of the arbitrary values $t_{i(--)}$, $t_i$, $u_{i(--)}$, and $u_{i(-)}$ may be performed when any one of the processing from Steps S111-$A_i$ to S115-$A_i$ is executed, in response to requests from the other joint possession units 215-$A_{i(--)}$, 215-$A_{i(++)}$, 215-$A_{i(+)}$, and 215-$A_{i(-)}$, or in response to other events, or may be performed in advance. The joint possession unit 215-$A_i$ outputs the obtained arbitrary values $t_{i(--)}$, $t_i$, $u_{i(--)}$, and $u_{i(-)}$ (Step S215-$A_i$).

The division unit 217-$A_i$ divides, using the share $[x_j]_i$ (j=0, . . . , N−1) output from the division unit 111-$A_i$ as input, the share $[x_j]_i$ into m(j) shares $[(x_j)_0]_i$, . . . , $[(x_j)_{m(j)-1}]_i \in F$ by secure computation and outputs the shares $[(x_j)_0]_i$, . . . , $[(x_j)_{m(j)-1}]_i$. To divide the share $[x_j]_i$ into m(j) shares $[(x_j)_0]_i$, . . . , $[(x_j)_{m(j)-1}]_i \in F$ by secure computation, it is only necessary to, for instance, separate and divide the share $[x_j]_i$ directly into m(j) shares $[(x_j)_0]_i$, . . . , $[(x_j)_{m(j)-1}]_i \in F$. It is to be noted that, if $[x_j]_i \in F^{m(i)}$ is a null value, $[(x_j)_0]_i$, . . . , $[(x_j)_{m(j)-1}]_i$ are also null values (Step S217-$A_i$).

The arbitrary values $t_{i(--)}$ and $u_{i(--)}$ and the shares $[(x_j)_0]_i$, . . . , $[(x_j)_{m(j)-1}]_i$ (j=0, . . . , N−1) are input to the checksum generation unit 218-$A_i$. The checksum generation unit 218-$A_i$ (a first checksum generation unit) obtains checksums $c_{i(--), i}$ and $d_{i(--), i}$ in the following manner, using the arbitrary values $t_{i(--)}$ and $u_{i(--)}$ and the shares $[(x_j)_0]_i$, . . . , $[(x_j)_{m(j)-1}]_i$, and outputs the checksums $c_{i(--), i}$ and $d_{i(--), i}$.

$$c_{i(-),i} = \sum_{0 \le j < m'(i(--))} \{t_i(--)^{j+1}[(x'_{i(--)})_j]_i\} + t_{i(--)}^{m'(i(--))}[x'_{i(--)})_{m'(i(--))-1}]_i \in F^v$$

$$d_{i(-),i} = \sum_{0 \le j < m'(i(--))} \{u_i(--)^{j+1}[(x'_{i(--)})_j]_i\} + u_{i(--)}^{m'(i(--))}[x'_{i(--)})_{m'(i(--))-1}]_i \in F^v$$

It is to be noted that δ=0, . . . , N−1 holds, ceil is a ceiling function, and m'(i) is ceil(m(i)/v). $[(x'_δ)_j]_i$ is $([(x_δ)_{vj}]_i$, $[(x_δ)_{vj+1}]_i$, . . . , $[(x_δ)_{v(j+1)-1}]_i) \in F^v$ belonging to a set $F^v$. Moreover, for j=m'(i)−1, if the number of $[(x_δ)_{vj}]_i$, $[(x_δ)_{vj+1}]_i$, . . . , $[(x_δ)_{v(j+1)-1}]_i$ is less than v, it is assumed that $[(x'_δ)_{(m'(i)-1)}]_i = ([(x_δ)_{v(m'(i)-1)}]_i$, $[(x_δ)_{v(m'(i)-1)+1}]_i$, . . . , $[(x_δ)_{m(i)-1}]_i$, 0, . . . , 0) $\in F^v$. The checksums $c_{i(--), i}$ and $d_{i(--), i}$ may be calculated on an extension field of the order v over basic field F. $\sum_{0 \le j < m'(i(--))} \{β_j\}$ represents $β_0 + \ldots + β_{m'(i(--))}$ and $β_{i(--)}^γ$ represents $(β_{i(--)})^γ$ (Steps S2181-$A_i$ and S2182-$A_i$).

The arbitrary values $t_i$ and $u_{i(-)}$ and the shares $[(x_j)_0]_i$, . . . , $[(x_j)_{m(j)-1}]_i$ (j=0, . . . , N−1) are input to the checksum generation unit 219-$A_i$. The checksum generation unit 219-$A_i$ (a second checksum generation unit) obtains checksums $c_{i, i}$ and $d_{i(-), i}$ in the following manner, using the arbitrary values $t_i$ and $u_{i(-)}$ and the shares $[(x_j)_0]_i$, . . . , $[(x_j)_{m(j)-1}]_i$, and outputs the checksums $c_{i, i}$ and $d_{i(-), i}$.

$$c_{i,i} = \sum_{0 \le j < m'(i)} \{t_i^{j+1}[(x'_i)_j]_i\} + t_i^{m'(i)+1}[(x'_i)_{m'(i)-1}]_i \in F^v$$

$$d_{i,i} = \sum_{0 \le j < m'(i)} \{u_i^{j+1}[(x'_i)_j]_i\} + u_i^{m'(i)+1}[(x'_i)_{m'(i)-1}]_i \in F^v$$

It is to be noted that $β_i^γ$ represents $(β_i)^γ$ and $β_{i(-)}^γ$ represents $(β_{i(-)})^γ$. The checksums $c_{i, i}$ and $d_{i(-), i}$ may be calculated on an extension field of the order v over basic field F (Steps 2191-$A_i$ and S2192-$A_i$).

The seed $s_i$ output from the seed obtaining unit 112-$A_i$, the calculated value $z_i$ output from the secure computation unit 115-$A_i$, the arbitrary values $t_{i(--)}$, $t_i$, $u_{i(--)}$, and $u_{i(-)}$ output from the joint possession unit 215-$A_i$, the checksums $c_{i(--)}$, and $d_{i(--)}$, output from the checksum generation unit 218-$A_i$, and the checksums $c_{i,\ i(-)}$ and $d_{i(-),\ i}$ output from the checksum generation unit 219-$A_i$ are input to the share generation unit 216-$A_j$. The share generation unit 216-$A_i$ obtains information containing the seed $s_i$, the calculated value $z_i$, the arbitrary values $t_{i(--)}$, $t_i$, $u_{i(--)}$, and $u_{i(-)}$, and the checksums $c_{i(--),\ i}$, $d_{i(--),\ i}$, $c_{i,\ i}$, and $d_{i(-),\ i}$ as a share $SS_i$ of the plaintext x in secret sharing and outputs the share $SS_i$ (Step S216-$A_i$).

The share $SS_i$ output from the share generation unit 216-$A_i$ is input to the communication unit 118-$A_i$. The communication unit 118-$A_i$ outputs the share $SS_i$ to the reconstructing device 22. The output share $SS_i$ is transmitted to the reconstructing device 22 through the network. The size of the seed $s_i$, N, and v do not depend on m. In (2, N)-Shamir's secret sharing, the order of magnitude of the total share size (the total share size which is transmitted) that relates to the data size in of the plaintext x is O(Nm); in the present embodiment, the order of magnitude of the total share size that relates to the data size m of the plaintext x is just O(m). The size of each share is O(m/N). For example, the total amount of data of the share $SS_i$ which is transmitted from each share generating device 21-$A_i$ (i=0, . . . , N−1) is less than N times the amount of data of the plaintext x. For instance, the amount of data of each share $SS_i$ is smaller than the amount of data of the plaintext x (Step S218-$A_i$).

<Reconstruction Method>

A reconstruction method which is performed by the reconstructing device 22 (FIG. 3) of the present embodiment will be described using FIG. 5. N shares $SS_0$, . . . , $SS_{N-1}$ output from the share generating devices 21-$A_0$, . . . , 21-$A_{N-1}$ are received (accepted) by the communication unit 221 (an input unit) of the reconstructing device 22 and output (Step S221).

Next, as described in the first embodiment, the arithmetic unit 122 obtains a member $x_i=z_i-P_{m(i)}(s_{i(+)})\in F^{m(i)}$ using the calculated value $z_i$ contained in the share $SS_i$ and a seed $s_{i(+)}$ contained in a share $SS_{i(+)}$ and outputs the member $x_i$ (Step S122).

The checksums $c_{i(--),\ i}$, $d_{i(--),\ i}$, $c_{i,\ i}$, and $d_{i(--),\ i}$ contained in each share $SS_i$ (i=0, . . . , N−1) are input to the reconstruction unit 224. The reconstruction unit 224 reconstructs a checksum $c_i=\Sigma_{0\le j<m'(i)}\{t_i^{j+1}(x'_i)_j\}+t_i^{m'(i)+1}(x'_i)_{m'(i)-1}$ using the checksum $c_{i,\ i}$ contained in the share $SS_i$ and a checksum $c_{i,\ i(++)}$ contained in a share $SS_{i(++)}$ as shares in accordance with Shamir's secret sharing scheme (the 2-out-of-N threshold secret sharing scheme) described above and outputs the checksum $c_i$. Likewise, the reconstruction unit 224 reconstructs a checksum $d_i=\Sigma_{0\le j<m'(i)}\{u_i^{j+1}(x'_i)_j\}+u_i^{m'(i)+1}(x'_i)_{m'(i)-1}$ using a checksum $d_{i,\ i(+)}$ contained in the share $SS_{i(+)}$ and a checksum $d_{i,\ i(++)}$ contained in the share $SS_{i(++)}$ as shares in accordance with Shamir's secret sharing scheme described above and outputs the checksum $d_i$. Here, $c_{i,\ i(++)}=\Sigma_{0\le j<m'(i)}\{t_i^{j+1}[(x'_i)_j]_{i(++)}\}+t_i^{m(i)+1}[(x'_i)_{m'(i)-1}]_{i(++)}$ contained in the share $SS_{i(++)}$ and $c_{i,\ i}=\Sigma_{0\le j<m'(i)}\{t_i^{j+1}[(x'_i)_j]_i\}+t_i^{m'(i)+1}[(x'_i)_{m'(i)-1}]_i$ contained in the share $SS_i$ are shares of the checksum $c_i=\Sigma_{0\le j<m'(i)}\{t_i^{j+1}(x'_i)_j\}+t_i^{m'(i)+1}(x'_i)_{m'(i)-1}$ in accordance with Shamir's secret sharing scheme described above. Thus, the reconstruction unit 224 can reconstruct the checksum $c_i$ from $c_{i,\ i(++)}$, $c_{i,\ i}$, and the Lagrange coefficients. Moreover, $d_{i,\ i(+)}=\Sigma_{0\le j<m'(i)}\{u_i^{j+1}[(x'_i)_j]_{i(+)}\}+u_i^{m(i)+1}[(x'_i)_{m'(i)-1}]_{i(+)}$ contained in the share $SS_{i(+)}$ and $d_{i,\ i(++)}=\Sigma_{0\le j<m'(i)}\{u_i^{j+1}[(x'_i)_j]_{i(++)}\}+u_i^{m'(i)+1}[(x'_i)_{m'(i)-1}]_{i(++)}$ contained in the share $SS_{i(++)}$ are shares of the checksum $d_i=\Sigma_{0\le j<m'(i)}\{u_i^{j+1}(x'_i)_j\}+u_i^{m'(i)+1}(x'_i)_{m'(i)-1}$ in accordance with Shamir's secret sharing scheme described above. Thus, the reconstruction unit 224 can reconstruct the checksum $d_i$ from $d_{i,\ i(+)}$, $d_{i,\ i(++)}$, and the Lagrange coefficients (Steps S2241 and S2242).

The member $x_i$ output from the arithmetic unit 122 is input to a division unit 229. The division unit 229 divides the member $x_i\in F^{m(i)}$ into m(i) sub-members $(x_i)_0$, . . . , $(x_i)_{m(i)-1}\in F$ and outputs the m(i) sub-members $(x_i)_0$, . . . , $(x_i)_{m(i)-1}$. For example, the member $x_i$ is expressed as a sequence $(x_i)_0 | \ldots |(x_i)_{m(i)-1}$ obtained by arranging the m(i) sub-members $(x_i)_0$, . . . , $(x_i)_{m(i)-1}$, and the division unit 229 divides $x_i=(x_i)_0|\ldots|(x_i)_{m(i)-1}$ into the sub-members $(x_i)_0$, . . . , $(x_i)_{m(i)-1}$ (Step S229).

The arbitrary value $t_i$ contained in the share $SS_i$ or $SS_{i(++)}$, the arbitrary value $u_i$ contained in the share $SS_{i(+)}$ or $SS_{i(++)}$, and the sub-members $(x_i)_0$, . . . , $(x_i)_{m(i)-1}$ output from the division unit 229 are input to the verification value generation unit 225. The verification value generation unit 225 obtains verification values $vc_i$ and $vd_i$ in the following manner, using the arbitrary values $t_i$ and $u_i$ and the sub-members $(x_i)_0$, . . . , $(x_i)_{m(i)-1}$, and outputs the verification values $vc_i$ and $vd_i$.

$$vc_i=\Sigma_{0\le j<m'(i)}\{t_i^{j+1}(x'_i)_j\}+t_i^{m'(i)+1}(x'_i)_{m(i)-1}\in F^v$$

$$vd_i=\Sigma_{0\le j<m'(i)}\{u_i^{j+1}(x'_i)_j\}+u_i^{m'(i)+1}(x'_i)_{m(i)-1}\in F^v$$

It is to be noted that m'(i) is ceil(m(i)/v), $(x'_i)_j$ is $((x_i)_{vj}, (x_i)_{vj+1}, \ldots, (x_i)_{v(j+1)-1})\in F^v$ belonging to the set $F^v$, and $\beta_i^\gamma$ represents $(\beta_i)^\gamma$ (Step S2251, S2252).

The checksums $c_i$ and $d_i$ output from the reconstruction unit 224 and the verification values $vc_i$ and $vd_i$ output from the verification value generation unit 225 are input to the determination unit 226. The determination unit 226 determines whether $c_i=vc_i$ is satisfied for all i=0, . . . , N−1 (Step S2261). When a determination is made that $c_i\ne vc_i$ for any i, the control unit 128 makes the processing terminate with an error message (Step S2263). On the other hand, when a determination is made that $c_i=vc_i$ is satisfied for all i=0, . . . , N−1, the determination unit 226 determines whether $d_i=vd_i$ is satisfied for all i=0, . . . , N−1 (Step S2262). When a determination is made that $d_i\ne vd_i$ for any i, the control unit 128 makes the processing terminate with an error message (Step S2263). On the other hand, when a determination is made that $d_i=vd_i$ is satisfied for all i=0, . . . , N−1, the members $x_0$, . . . , $x_{N-1}$ obtained in the arithmetic unit 122 are input to the concatenation unit 123. In this case, as described in the first embodiment, the concatenation unit 123 obtains a reconstructed value x obtained by concatenating the members $x_0$, . . . , $x_{N-1}$ to one another and outputs the reconstructed value x (Step S123).

Features of the Present Embodiment

Also in the present embodiment, it is possible to make the total amount of communication data smaller than that of shares in accordance with Shamir's secret sharing scheme. Each share generating device 21-$A_i$ can obtain the share $SS_i$ whose amount of data is small from the share $[x]_i$ in accordance with Shamir's secret sharing scheme without obtaining information on the plaintext x. The reconstructing device 22 can reconstruct the plaintext x using the N shares $SS_0$, . . . , $SS_{N-1}$.

Furthermore, in the present embodiment, the share $SS_i$ contains checksums and the reconstructing device 22 performs verification of the checksums. Thus, the reconstructing device 22 can detect unauthorized processing performed in any share generating device 21-$A_i$. Moreover, since the reconstructing device 22 verifies two types of checksums, the checksums $c_i$ and $d_i$, for each i=0, ..., N−1, it is also possible to detect the generation of an unauthorized checksum in any share generating device 21-$A_i$.

First Modification of the Second Embodiment

In the second embodiment, when a determination is made in Step S2261 that $c_i$=$vc_i$ is satisfied, a determination as to whether $d_i$=$vd_i$ is satisfied is made in Step S2262. However, other determination processing may be performed, as long as processing in Step S123 is executed when $c_i$=$vc_i$ and $d_i$=$vd_i$ are satisfied for all i=0, ..., N−1; otherwise Step S2263 is executed.

Second Modification of the Second Embodiment

In the second embodiment, the reconstructing device 22 verifies two types of checksums, the checksums $c_i$ and $d_i$. However, the reconstructing device 22 may be configured so as to verify only one of the checksums $c_i$ and $d_i$. Processing in this case is as follows.

<Share Generation Method>

After the processing from Steps S111-$A_i$ to S115-$A_i$ is executed, in place of the processing in Step S215-$A_i$, (Processing I) the joint possession unit 215-$A_i$ of each share generating device 21-$A_i$ possesses the arbitrary value $t_{i(--)}$ ∈F jointly with the joint possession unit 215-$A_{i(--)}$ of the share generating device 21-$A_{i(--)}$ and possesses the arbitrary value $t_i$∈F jointly with the joint possession unit 215-$A_{i(++)}$ of the share generating device 21-$A_{i(++)}$ or (Processing 11) the joint possession unit 215-$A_i$ of each share generating device 21-$A_i$ possesses the arbitrary value $u_{i(-)}$∈F jointly with the joint possession unit 215-$A_{i(+)}$ of the share generating device 21-$A_{i(+)}$ and possesses the arbitrary value $u_{i(-)}$ ∈F jointly with the joint possession unit 215-$A_{i(-)}$ of the share generating device 21-$A_{i(-)}$. Only Processing I is executed for all i=0, ..., N−1 or only Processing II is executed for all i=0, ..., N−1.

Next, the division unit 217-$A_i$ executes the processing in Step S217-$A_i$.

Then, the following processing is executed depending on Processing I or Processing II. When joint possession of the arbitrary value $t_{i(--)}$ has been performed by the joint possession unit 215-$A_i$ (Processing I), the checksum generation unit 218-$A_i$ performs Step S2181-$A_i$ described above, and obtains the checksum $c_{i(--), i} = \Sigma_{0 \le j < m'(i(--))}\{t_{i(--)}^{j+1}[(x'_{i(--)})_j]_i\} + t_{i(--)}^{m'(i(--))+1}[(x'_{i(--)})_{m'(i(--))-1}]_i \in F^v$ and outputs the checksum $c_{i(--), i}$. In this case, the processing in Step S2182-$A_i$ described above is not executed.

On the other hand, when joint possession of the arbitrary value $u_{i(--)}$ has been performed by the joint possession unit 215-$A_i$ (Processing II), the checksum generation unit 218-$A_i$ performs Step S2182-$A_i$ described above, and obtains the checksum $d_{i(--), i} = \Sigma_{0 \le j < m'(i(--))}\{u_{i(--)}^{j+1}[(x'_{j(--)})_j]_i\} + u_{i(--)}^{m'(i(--))+1}[(x'_{i(--)})_{m'(i(--))-1}]_i \in F^v$ and outputs the checksum $d_{i(--), i}$. In this case, the processing in Step S2181-$A_i$ described above is not executed.

Next, when joint possession of the arbitrary value $t_i$ has been performed by the joint possession unit 215-$A_i$ (Processing I), the checksum generation unit 219-$A_i$ performs Step S2191-$A_i$ described above, and obtains the checksum $c_{i, i} = \Sigma_{0 \le j < m'(i)}\{t_i^{j+1}[(x'_i)_j]_i\} + t_i^{m'(i)+1}[(x'_i)_{m'(i)-1}]_i \in F^v$ and outputs the checksum $c_{i, i}$. In this case, the processing in Step S2192-$A_i$ described above is not executed.

On the other hand, when joint possession of the arbitrary value $u_{i(-)}$ has been performed by the joint possession unit 215-$A_i$ (Processing II), the checksum generation unit 219-$A_i$ performs Step S2192-$A_i$ described above, and obtains the checksum $d_{i(-), i} = \Sigma_{0 \le j < m'(i)}\{u_{i(-)}^{j+1}[(x'_{i(-)})_j]_i\} + u_{i(-)}^{m'(i(-))+1}[(x'_{i(-)})_{m'(i(-))-1}]_i \in F^v$ and outputs the checksum $d_{i(-), i}$. In this case, the processing in Step S2191-$A_i$ described above is not executed.

Then, in place of the processing in Step S216-$A_i$, the following processing is executed depending on Processing I or Processing II. When joint possession of the arbitrary value $t_{i(--)}$ and the arbitrary value $t_i$ has been performed by the joint possession unit 215-$A_i$ (Processing I), the share generation unit 216-$A_i$ obtains information containing the seed $s_i$, the calculated value $z_i$, the arbitrary value $t_{i(--)}$, the arbitrary value $t_i$, the checksum $c_{i(--), i}$, and the checksum $c_{i, i}$ as the share $SS_i$ and outputs the share $SS_i$. On the other hand, when joint possession of the arbitrary value $u_{i(--)}$ and the arbitrary value $u_{i(-)}$ has been performed by the joint possession unit 215-$A_i$ (Processing II), the share generation unit 216-$A_i$ obtains information containing the seed $s_i$, the calculated value $z_i$, the arbitrary value $u_{i(--)}$, the arbitrary value $u_{i(-)}$, the checksum $d_{i(--), i}$, and the checksum $d_{i(-), i}$ as the share $SS_i$ and outputs the share $SS_i$. Then, the processing in Step S218-$A_i$ is executed.

<Reconstruction Method>

After the processing in Steps S221 and S122 is executed, the reconstruction unit 224 performs the following processing. When the share $SS_i$ contains the checksum $c_{i, i}$ and the share $SS_{i(++)}$ contains the checksum $c_{i, i(++)}$ (Processing 1), the reconstruction unit 224 executes Step S2241, and reconstructs the checksum $c_i$ using the checksum $c_{i, i}$ and the checksum $c_{i, i(++)}$ as shares in accordance with Shamir's secret sharing scheme and outputs the checksum $c_i$. In this case, the processing in Step S2242 described above is not executed.

On the other hand, when the share $SS_{i(+)}$ contains the checksum $d_{i, i(+)}$ and the share $SS_{i(++)}$ contains the checksum $d_{i, i(++)}$ (Processing II), the reconstruction unit 224 executes Step S2242, and reconstructs the checksum $d_i$ using the checksum $d_{i, i(+)}$ and the checksum $d_{i, i(++)}$ as shares in accordance with Shamir's secret sharing scheme and outputs the checksum $d_i$. In this case, the processing in Step S2241 described above is not executed.

Next, the division unit 229 executes the processing in Step S229.

Then, the following processing is executed depending on Processing I or Processing II. When the checksum $c_i$ has been reconstructed (Processing I), the verification value generation unit 225 executes the processing in Step S2251, and obtains the verification value $vc_i = \Sigma_{0 \le j < m'(i)}\{t_i^{j+1}(x'_i)_j\} + t_i^{m'(i)+1}(x'_i)_{m'(i)-1} \in F^v$ and outputs the verification value $vc_i$. In this case, the processing in Step S2252 described above is not executed. On the other hand, when the checksum $d_i$ has been reconstructed (Processing II), the verification value generation unit 225 executes the processing in Step S2252, and obtains the verification value $vd_i = \Sigma_{0 \le j < m'(i)}\{u_i^{j+1}(x'_i)_j\} + u_i^{m'(i)+1}(x'_i)_{m'(i)-1} \in F^v$ and outputs the verification value $vd_i$. In this case, the processing in Step S2251 described above is not executed.

Then, the following processing is executed depending on Processing I or Processing II. If the checksum $c_i$ has been reconstructed (Processing I), the determination unit 226 determines in Step S2261 whether $c_i$=$vc_i$ is satisfied for all i=0, ..., N−1. The processing in Step S2262 is not executed in this case. If a determination is made that $c_i$≠$vc_i$ for any i, the control unit 128 makes the processing terminate with an error message (Step S2263). On the other hand, if a determination is made that $c_i$=$vc_i$ is satisfied for all i=0, ..., N−1, the procedure proceeds to Step S123. On the other hand, if the checksum $d_i$ has been reconstructed (Processing II), the determination unit 226 determines in Step S2262 whether $d_i = vd_i$ is satisfied for all $i = 0, \ldots, N-1$. The processing in Step S2261 is not executed in this case. If a determination is made that $d_i \neq vd_i$ for any i, the control unit 128 makes the processing terminate with an error message (Step S2263). On the other hand, if a determination is made that $d_i = vd_i$ is satisfied for all $i = 0, \ldots, N-1$, the procedure proceeds to Step S123.

[Other Modifications and so Forth]

It is to be noted that the present invention is not limited to the foregoing embodiments. For example, the above-described various kinds of processing may be executed, in addition to being executed in chronological order in accordance with the descriptions, in parallel or individually depending on the processing power of a device that executes the processing or when necessary. In addition, it goes without saying that changes may be made as appropriate without departing from the spirit of the present invention.

The above-described each device is embodied by execution of a predetermined program by a general- or special-purpose computer having a processor (hardware processor) such as a central processing unit (CPU), memories such as random-access memory (RAM) and read-only memory (ROM), and the like, for example. The computer may have one processor and one memory or have multiple processors and memories. The program may be installed on the computer or pre-recorded on the ROM and the like. Also, some or all of the processing units may be embodied using an electronic circuit that implements processing functions without using programs, rather than an electronic circuit (circuitry) that implements functional components by loading of programs like a CPU. An electronic circuit constituting a single device may include multiple CPUs.

When the above-described configurations are implemented by a computer, the processing details of the functions supposed to be provided in each device are described by a program. As a result of this program being executed by the computer, the above-described processing functions are implemented on the computer. The program describing the processing details can be recorded on a computer-readable recording medium. An example of the computer-readable recording medium is a non-transitory recording medium. Examples of such a recording medium include a magnetic recording device, an optical disk, a magneto-optical recording medium, and semiconductor memory.

The distribution of this program is performed by, for example, selling, transferring, or lending a portable recording medium such as a DVD or a CD-ROM on which the program is recorded. Furthermore, a configuration may be adopted in which this program is distributed by storing the program in a storage device of a server computer and transferring the program to other computers from the server computer via a network.

The computer that executes such a program first, for example, temporarily stores the program recorded on the portable recording medium or the program transferred from the server computer in a storage device thereof. At the time of execution of processing, the computer reads the program stored in the storage device thereof and executes the processing in accordance with the read program. As another mode of execution of this program, the computer may read the program directly from the portable recording medium and execute the processing in accordance with the program and, furthermore, every time the program is transferred to the computer from the server computer, the computer may sequentially execute the processing in accordance with the received program. A configuration may be adopted in which the transfer of a program to the computer from the server computer is not performed and the above-described processing is executed by so-called application service provider (ASP)-type service by which the processing functions are implemented only by an instruction for execution thereof and result acquisition.

Instead of executing a predetermined program on the computer to implement the processing functions of the present devices, at least some of the processing functions may be implemented by hardware.

DESCRIPTION OF REFERENCE NUMERALS 1 secure computation system
11-$A_i$, 21-$A_i$ share generating device
12, 22 reconstructing device

What is claimed is:

1. A secure computation system comprising:
N share generating devices $A_0, \ldots, A_{N-1}$, wherein
N is an integer greater than or equal to 2, m is an integer greater than or equal to 1, m(i) is an integer greater than or equal to 0 and less than m, $i = 0, \ldots, N-1$ holds, $j = 0, \ldots, N-1$ holds, $i(+) = i+1 \mod N$ holds, $i(-) = i-1 \mod N$ holds, $P_{m(i)}$ is a function, and a range of the function $P_{m(i)}$ belongs to a set $F^{m(i)}$ whose members are sequences of elements of m(i) fields F,
a sum of a value which is obtained by multiplying a share $[\alpha]_i$ in accordance with Shamir's secret sharing scheme by a Lagrange coefficient $\lambda(i, i(-))$ and a value which is obtained by multiplying a share $[\alpha]_{i(-)}$ in accordance with the Shamir's secret sharing scheme by a Lagrange coefficient $\lambda(i(-), i)$ is a reconstructed value $\alpha$ and a sum of a value which is obtained by multiplying the share $[\alpha]_i$ by a Lagrange coefficient $\lambda(i, i(+))$ and a value which is obtained by multiplying a share $[\alpha]_{i(+)}$ in accordance with the Shamir's secret sharing scheme by a Lagrange coefficient $\lambda(i(+), i)$ is the reconstructed value $\alpha$,
a share $[x]_i \in F^m$ of plaintext x in accordance with the Shamir's secret sharing scheme is expressed by N shares $[x_0]_i, \ldots, [x_{N-1}]_i$ which satisfy $m = m(0) + \ldots + m(N-1)$ and $[x_j]_i \in F^{m(j)}$,
a share generating device $A_i$ included in the N share generating devices $A_0, \ldots, A_{N-1}$ includes processing circuitry configured to
store the share $[x]_i$ of plaintext x, and each of the N share generating devices $A_0, \ldots, A_{N-1}$ store a respective share $[x]_i$ of plaintext x, and the plaintext x cannot be reconstructed with only one share of the plaintext x,
obtain a function value $r_i = P_{m(i(-))}(s_i) \in F^{m(i(-))}$ of an input seed $s_i$,
obtain a first calculated value $\zeta_i = \lambda(i, i(-))[x_{i(-)}]_i + r_i \in F^{m(i(-))}$ using the Lagrange coefficient $\lambda(i, i(-))$, a share $[x_{i(-)}]_i$, and the function value $r_i$,
output the first calculated value $\zeta_i$ to a share generating device $A_{i(-)}$, through a network, among the N share generating devices $A_0, \ldots, A_{N-1}$,
accept a second calculated value $\zeta_{i(+)} \in F^{m(i)}$, from a share generating device $A_{i(+)}$, through the network, among the N share generating devices $A_0, \ldots, A_{N-1}$,
obtain a third calculated value $z_i = \lambda(i, i(+))[x_i]_i + \zeta_{i(+)} \in F^{m(i)}$ using the Lagrange coefficient $\lambda(i, i(+))$, the share $[x_i]_i$, and the second calculated value $\zeta_{i(+)}$, and obtain information containing the seed $s_i$ and the third calculated value $z_i$ as a share $SS_i$ of the plaintext x in secret sharing and outputs the share $SS_i$ through the network, the total amount of data of the shares $SS_0, \ldots, SS_{N-1}$ is less than N times the amount of data of the plaintext x, wherein the secure computation system further comprises a reconstructing device being configured to reconstruct the plaintext x using N shares $SS_0, \ldots, SS_{N-1}$, wherein the reconstructing device includes processing circuitry configured to accept N shares $SS_0, \ldots, SS_{N-1}$ through the network, obtain a member $x_i = z_i - P_{m(i)}(s_{i(+)}) \in F^{m(i)}$ using the third calculated value $z_i \in F^{m(i)}$ contained in the share $SS_i$ and a seed $s_{i(+)}$ contained in a share $SS_{i(+)}$, and obtain a reconstructed value $x \in F^m$ which is expressed by obtained members $x_0, \ldots, x_{N-1}$.

2. The secure computation system according to claim 1, wherein

N is an integer greater than or equal to 3, $i(++) = i+2 \mod N$ holds, $i(--) = i-2 \mod N$ holds, $\delta = 0, \ldots, N-1$ holds, v is an integer greater than or equal to 1, ceil is a ceiling function, the share $[x_j]_i$ can be divided into m(j) shares $[(x_j)_0]_i, \ldots, [(x_j)_{m(j)-1}]_i \in F$, m'(i) is ceil(m(i)/v), and $[(x'_\delta)_j]_i$ is $([(x_\delta)_{vj}]_i, [(x_\delta)_{vj+1}]_i, \ldots, [(x_\delta)_{v(j+1)-1}]_i) \in F^v$ belonging to a set $F^v$, the processing circuitry of the share generating device $A_i$ is further configured to possess an arbitrary value $t_{i(--)} \in F^v$ jointly with a share generating device $A_{i(--)}$ and possess an arbitrary value $t_i \in F^v$ jointly with a share generating device $A_{i(++)}$ and/or possess an arbitrary value $u_{i(--)} \in F^v$ jointly with a share generating device $A_{i(+)}$ and possess an arbitrary value $u_{i(-)} \in F^v$ jointly with the share generating device $A_{i(-)}$, obtain a checksum $c_{i(--),i} = \Sigma_{0 \leq j < m'(i(--))} \{t_{i(--)}^{j+1}[(x'_{i(--)})_j]_i\} + t_{i(--)}^{m'(i(--))+1}[(x'_{i(--)})_{m'(i(--))-1}]_i \in F^v$ when joint possession of the arbitrary value $t_{i(--)}$ has been performed and obtains a checksum $d_{i(--),i} = \Sigma_{0 \leq j < m'(i(--))} \{u_{i(--)}^{j+1}[(x'_{i(--)})_j]_i\} + u_{i(--)}^{m'(i(--))+1}[(x'_{i(--)})_{m'(i(--))-1}]_i \in F^v$ when joint possession of the arbitrary value $u_{i(--)}$ has been performed, and obtain a checksum $c_{i,i} = \Sigma_{0 \leq j < m'(i)} \{t_i^{j+1}[(x'_i)_j]_i\} + t_i^{m'(i)+1}[(x'_i)_{m'(i)-1}]_i \in F^v$ when joint possession of the arbitrary value $t_i$ has been performed and obtain a checksum $d_{i(-),i} = \Sigma_{0 \leq j < m'(i(-))} \{u_{i(-)}^{j+1}[(x'_{i(-)})_j]_i\} + u_{i(-)}^{m'(i(-))+1}[(x'_{i(-)})_{m'(i(-))-1}]_i \in F^v$ when joint possession of the arbitrary value $u_{i(-)}$ has been performed, when joint possession of the arbitrary value $t_{i(--)}$ and the arbitrary value $t_i$ has been performed, the share $SS_i$, which is generated, further contains the arbitrary value $t_{i(--)}$, the arbitrary value $t_i$, the checksum $c_{i(--), i}$, and the checksum $c_{i, i}$, and when joint possession of the arbitrary value $u_{i(--)}$ and the arbitrary value $u_{i(-)}$ has been performed, the share $SS_i$, which is generated, further contains the arbitrary value $u_{i(--)}$, the arbitrary value $u_{i(-)}$, the checksum $d_{i(--), i}$, and the checksum $d_{i(-), i}$.

3. The secure computation system according to claim 1, wherein

N is an integer greater than or equal to 3, $i(++) = i+2 \mod N$ holds, $i(--) = i-2 \mod N$ holds, $\delta = 0, \ldots, N-1$ holds, v is an integer greater than or equal to 1, ceil is a ceiling function, the share $[x_j]_i$ can be divided into m(j) shares $[(x_j)_0]_i, \ldots, [(x_j)_{m(j)-1}]_i \in F$, m'(i) is ceil(m(i)/v), and $[(x'_\delta)_j]_i$ is $([(x_\delta)_{vj}]_i, [(x_\delta)_{vj+1}]_i, \ldots, [(x_\delta)_{v(j+1)-1}]_i) \in F^v$ belonging to a set $F^v$, the processing circuitry of the share generating device $A_i$ is further configured to possess an arbitrary value $t_{j(--)} \in F^v$ jointly with a share generating device $A_{i(--)}$, possess an arbitrary value $t_i \in F^v$ jointly with a share generating device $A_{i(++)}$, possess an arbitrary value $u_{i(--)} \in F^v$ jointly with a share generating device $A_{i(+)}$, and possess an arbitrary value $u_{i(-)} \in F^v$ jointly with the share generating device $A_{i(-)}$, obtain a checksum $c_{i(--),i} = \Sigma_{0 \leq j < m'(i(--))} \{t_{i(--)}^{j+1}[(x'_{i(--)})_j]_i\} + t_{i(--)}^{m'(i(--))+1}[(x'_{i(--)})_{m'(i(--))-1}]_i \in F^v$ and obtain a checksum $d_{i(--),i} = \Sigma_{0 \leq j < m'(i(--))} \{u_{i(--)}^{j+1}[(x'_{i(--)})_j]_i\} + u_{i(--)}^{m'(i(--))+1}[(x'_{i(--)})_{m'(i(--))-1}]_i \in F^v$, and obtain a checksum $c_{i,i} = \Sigma_{0 \leq j < m'(i)} \{t_i^{j+1}[(x'_i)_j]_i\} + t_j^{m'(i)+1}[(x'_i)_{m'(i)-1}]_i \in F^v$ and obtains a checksum $d_{i(-),i} = \Sigma_{0 \leq j < m'(i(-))} \{u_{i(-)}^{j+1}[(x'_{i(-)})_j]_i\} + u_{i(-)}^{m'(i(-))+1}[(x'_{i(-)})_{m'(i(-))-1}]_i \in F^v$, and the share $SS_i$, which is generated, further contains the arbitrary value $t_{i(--)}$, the arbitrary value $t_i$, the arbitrary value $u_{i(--)}$, the arbitrary value $u_{i(-)}$, the checksum $c_{i(--), i}$, the checksum $c_{i, i}$, the checksum $d_{i(--), i}$, and the checksum $d_{i(-), i}$.

4. The secret computation system according to any one of claims 2, 3, and 1, wherein an amount of data of the seed $s_i$ is smaller than an amount of data of the function value $r_i$.

5. A method implemented by a secure computation system that includes N share generating devices $A_0, \ldots, A_{N-1}$, wherein N is an integer greater than or equal to 2, m is an integer greater than or equal to 1, m(i) is an integer greater than or equal to 0 and less than m, $i = 0, \ldots, N-1$ holds, $j = 0, \ldots, N-1$ holds, $i(+) = i+1 \mod N$ holds, $i(-) = i-1 \mod N$ holds, $P_{m(i)}$ is a function, and a range of the function $P_{m(i)}$ belongs to a set $F^{m(i)}$ whose members are sequences of elements of m(i) fields F, a sum of a value which is obtained by multiplying a share $[\alpha]_i$ in accordance with Shamir's secret sharing scheme by a Lagrange coefficient $\lambda(i, i(-))$ and a value which is obtained by multiplying a share $[\alpha]_{i(-)}$ in accordance with the Shamir's secret sharing scheme by a Lagrange coefficient $\lambda(i(-), i)$ is a reconstructed value $\alpha$ and a sum of a value which is obtained by multiplying the share $[\alpha]_i$ by a Lagrange coefficient $\lambda(i, i(+))$ and a value which is obtained by multiplying a share $[\alpha]_{i(+)}$ in accordance with the Shamir's secret sharing scheme by a Lagrange coefficient $\lambda(i(+), i)$ is the reconstructed value $\alpha$, a share $[x]_i \in F^m$ of plaintext x in accordance with the Shamir's secret sharing scheme is expressed by N shares $[x_0]_i, \ldots, [x_{N-1}]_i$ which satisfy $m = m(0) + \ldots + m(N-1)$ and $[x_j]_i \in F^{m(j)}$, the method comprising:

performing, by processing circuitry of a share generating device $A_i$ included in the N share generating devices $A_0, \ldots, A_{N-1}$, storing the share $[x]_i$ of plaintext x, and each of the N share generating devices $A_0, \ldots, A_{N-1}$ store a respective share $[x]_i$ of plaintext x, and the plaintext x cannot be reconstructed with only one share of the plaintext x, obtaining a function value $r_i = P_{m(i(-))}(s_i) \in F^{m(i(-))}$ of an input seed $s_i$, obtaining a first calculated value $\zeta_i = \lambda(i, i(-))[x_{i(-)}]_i + r_i \in F^{m(i(-))}$ using the Lagrange coefficient $\lambda(i, i(-))$, a share $[x_{i(-)}]_i$, and the function value $r_i$, outputting the first calculated value $\zeta_i$ to a share generating device $A_{i(-)}$, through a network, among the N share generating devices $A_0, \ldots, A_{N-1}$, accepting a second calculated value $\zeta_{i(+)} \in F^{m(i)}$, from a share generating device $A_{i(+)}$, through the network, among the N share generating devices $A_0, \ldots, A_{N-1}$, obtaining a third calculated value $z_i=\lambda(i, i(+))[x_i]_i+\zeta_{i(+)}\in F^{m(i)}$ using the Lagrange coefficient $\lambda(i, i(+))$, the share $[x_i]_i$, and the second calculated value $\zeta_{i(+)}$, and obtaining information containing the seed $s_i$ and the third calculated value $z_i$ as a share $SS_i$ of the plaintext x in secret sharing and outputs the share $SS_i$ through the network, the total amount of data of the shares $SS_0, \ldots, SS_{N-1}$ is less than N times the amount of data of the plaintext x, wherein the secure computation system further comprises a reconstructing device being configured to reconstruct the plaintext x using N shares $SS_0, \ldots, SS_{N-1}$, wherein the method further comprising:

performing, by processing circuitry of the reconstructing device accepting N shares $SS_0, \ldots, SS_{N-1}$ through the network, obtaining a member $x_i=z_i-P_{m(i)}(s_{i(+)})\in F^{m(i)}$ using the third calculated value $z_i\in F^{m(i)}$ contained in the share $SS_i$ and a seed $s_{i(+)}$ contained in a share $SS_{i(+)}$, and obtaining a reconstructed value $x\in F^m$ which is expressed by obtained members $x_0, \ldots, x_{N-1}$.

* * * * *